US006456365B1

(12) United States Patent
Hosaka et al.

(10) Patent No.: US 6,456,365 B1
(45) Date of Patent: Sep. 24, 2002

(54) ORIGINAL COVER CLOSER

(75) Inventors: Hiroaki Hosaka; Hirofumi Kohda, both of Kanagawa (JP)

(73) Assignee: Katoh Electric Machinery Co., Ltd., Kanagawa (JP)

( * ) Notice: Subject to any disclaimer, the term of this patent is extended or adjusted under 35 U.S.C. 154(b) by 85 days.

(21) Appl. No.: 09/717,369

(22) Filed: Nov. 21, 2000

(30) Foreign Application Priority Data

Nov. 30, 1999 (JP) .......................................... 11-341445

(51) Int. Cl.[7] ........................ G03B 27/62; G03B 27/64; B41J 2/01; G03G 15/00; G03G 15/02

(52) U.S. Cl. ........................... 355/75; 355/76; 347/101; 347/104; 347/108; 347/152; 399/361; 399/363; 399/380; 399/377; 399/367; 399/176

(58) Field of Search ..................... 355/75, 76; 347/101, 347/104, 108, 152; 399/361, 363, 380, 377, 367, 176

(56) References Cited

U.S. PATENT DOCUMENTS 4,804,993 A * 2/1989 Kenin et al.
5,041,872 A * 8/1991 Nukaya et al.
5,160,963 A * 11/1992 Haneda et al.
5,541,712 A * 7/1996 Fujitaka et al.
5,621,501 A * 4/1997 Matsuo et al.
6,100,963 A * 8/2000 Hosaka
6,233,426 B1 * 5/2001 Lee et al.

* cited by examiner

*Primary Examiner*—Russell Adams
*Assistant Examiner*—Khaled Brown
(74) *Attorney, Agent, or Firm*—Notaro & Michalos P.C.

(57) ABSTRACT

In order to eliminate the cam member, which is mounted to the mounting member side and to which grease is applied, to prevent, as much as possible, the portions to which grease has been applied from becoming exposed to the side of an original placed on the contact glass, an original cover closer is arranged from a mounting member, which has a mounting base and side plates, which are raised from both sides of the mounting base, and has the abovementioned mounting base mounted to the main device unit side, a supporting member, which supports an original cover, has a back plate as well as side plates and a top plate, which are bent from the back plate, and has one end of each of the side plates being rotatably mounted via a hinge pin to the corresponding side plate of the abovementioned mounting member, a cam slider, which is fitted inside the supporting member in a manner enabling sliding towards the side of the abovementioned mounting member, a pressure bearing pin, which is axially mounted between the respective side plates of the abovementioned mounting member and is made to contact a cam part provided at the end of the cam slider, and a coil spring, which is resiliently installed between the abovementioned cam slider and the free end side of the abovementioned supporting member, and by making the cam member a pressure bearing pin, portions to which grease are applied is prevented from becoming exposed to the side of the original placed on the contact glass.

8 Claims, 12 Drawing Sheets

ORIGINAL COVER CLOSER

BACKGROUND OF THE INVENTION

1. Field of the Invention

This invention concerns an original cover closer, which is favorable for use in the opening and closing of the original cover of a copier, printer, etc.

2. Description of the Prior Art

Japanese Unexamined Patent Publication No. Hei-10-104758 discloses a prior-art original cover closer comprised of a mounting member, which is mounted to the main device unit, an original cover supporting member, which is rotatably mounted to the mounting member via a hinge pin, a slider, which is slidably fitted inside the supporting member, a cam member, which is in contact with the slider and is fixed between the respective side plates of the abovementioned mounting member, and a coil spring, which is resiliently mounted between the abovementioned slider and the free end side of the abovementioned supporting member.

With this original cover closer, which uses a cam member and a slider, lubrication grease must be applied to the surface of the cam face of the cam member in order to enable good sliding between the cam face of the cam member and the slider, which slides along the cam face in a closely contacting manner. However, when the opening/closing operation of the original cover is performed upon setting an original on the contact glass to make a copy, since the surface of the cam member to which grease was applied is exposed to the exterior, there was the possibility of grease becoming attached to and soiling the original set on the contact glass, when the end parts of the original came in contact with the cam member.

OBJECT OF THE INVENTION

This invention has been made in view of the above-described problem in the prior art and an object thereof is to provide an original cover closer, with which the cam member to be mounted to the mounting member side is eliminated so that portions to which grease is applied will be prevented as much as possible from becoming exposed to the side of the original set on the contact glass.

SUMMARY OF THE INVENTION

In order to achieve the above object, this invention provides an original cover closer, comprised of a mounting member, which has a mounting base and side plates, which are raised from both sides of the mounting base, and has the abovementioned mounting base mounted to the main device unit side, a supporting member, which supports an original cover, has a back plate as well as side plates and a top plate, which are bent from the back plate, and has one end of each of the side plates being rotatably mounted via a hinge pin to the corresponding side plate of the abovementioned mounting member, a cam slider, which is fitted inside the supporting member in a manner enabling sliding towards the side of the abovementioned mounting member, a pressure bearing pin, which is axially mounted between the respective side plates of the abovementioned mounting member and is made to contact a cam part provided at the end of the cam slider, and a coil spring, which is resiliently installed between the abovementioned cam slider and the free end side of the abovementioned supporting member.

This invention also provides an original cover closer, which is comprised of a mounting member, which has a mounting base and side plates, which are raised from both sides of the mounting base, and has the abovementioned mounting base mounted to the main device unit side, a supporting member, which supports an original cover, has a back plate as well as side plates and a top plate, which are bent from the back plate, and has one end of each of the side plates being rotatably mounted via a hinge pin to the corresponding side plate of the abovementioned mounting member, a cam slider, which is fitted inside the supporting member in a manner enabling sliding towards the side of the abovementioned mounting member, a pressure bearing pin, which is axially mounted between the respective side plates of the abovementioned mounting member and is made to contact a cam part provided at the end of the cam slider, a coil spring, which is resiliently installed between the above-mentioned cam slider and the free end side of the above-mentioned supporting member, and a damper means, which is inserted inside the above-mentioned coil spring and exhibits a damper action by the contacting of the tip of a piston boss with the above-mentioned cam slider from the point at which the above-mentioned supporting member is set at a prescribed angle of rotation in the process of closing the above-mentioned original cover.

This invention furthermore provides an original cover closer, comprised of a mounting member, which has at least a mounting base and side plates, which are raised from both sides of the mounting base, and has the abovementioned mounting base mounted to the main device unit side, a supporting member, which has at least a back plate and side plates, which are bent from the back plate, and has both side plates being rotatably connected via a hinge pin to both side plates of the abovementioned mounting member, a lifting member, which has a back plate, to which an original cover is mounted, has side plates and a top plate, which are bent from the back plate, and is axially attached via a connecting pin to the respective free end sides of both side plates of the abovementioned supporting member in a manner whereby both side plates of the lifting member can rotate in a direction that differs from the direction of rotation. of the supporting member, a pressure bearing pin, which is axially mounted at a position, between the respective side plates of the abovementioned mounting member, that differs from the mounting position of the hinge pin, a cam slider, which is fitted inside the supporting member in a manner enabling sliding and with which the cam part thereof contacts the pressure bearing pin, and a coil spring, which is resiliently installed between the abovementioned cam slider and the abovementioned lifting member and is thereby made to urge the abovementioned supporting member at least in the direction of opening of the original cover while rotatingly urging the abovementioned lifting member in the direction that overlaps it with the supporting member, and is characterized in that the coil spring is bent in advance in the direction of rotation of the abovementioned lifting member.

This invention furthermore provides an original cover closer, comprised of a mounting member, which has at least a mounting base and side plates, which are raised from both sides of the mounting base, and has the abovementioned mounting base mounted to the main device unit side, a supporting member, which has at least a back plate and side plates, which are bent from the back plate, and has both side plates being rotatably mounted via a hinge pin to both side plates of the abovementioned mounting member, a lifting member, which has a back plate, to which an original cover is mounted, has side plates and a top plate, which are bent from the back plate, and is axially attached via a connecting pin to the respective free end sides of both side plates of the abovementioned supporting member in a manner whereby both side plates of the lifting member can rotate in a direction that differs from the direction of rotation of the supporting member, an actuating member, which is mounted between the side plates of the lifting member at positions that are located at the side at which the lifting member is axially mounted to the abovementioned supporting member and swing about the abovementioned connecting pin as the fulcrum during the rotation of the abovementioned lifting member, a pressure bearing pin, which is axially mounted at a position, between the respective side plates of the abovementioned mounting member, that differs from the mounting position of the hinge pin, a cam slider, which is fitted inside the supporting member in a manner enabling sliding with the cam part thereof being made to contact the pressure bearing pin, a spring bearing cam member, which is slidably fitted at the free end side of the interior of the abovementioned supporting member while being made to contact the abovementioned actuating member, and a coil spring, which is resiliently installed between the abovementioned cam slider and the abovementioned spring bearing cam member and is thereby made to urge the abovementioned supporting member at least in the direction of opening of the original cover while rotatingly urging the abovementioned lifting member in the direction that overlaps it with the supporting member.

DETAILED DESCRIPTION OF THE PREFERRED EMBODIMENTS

Figure 1:
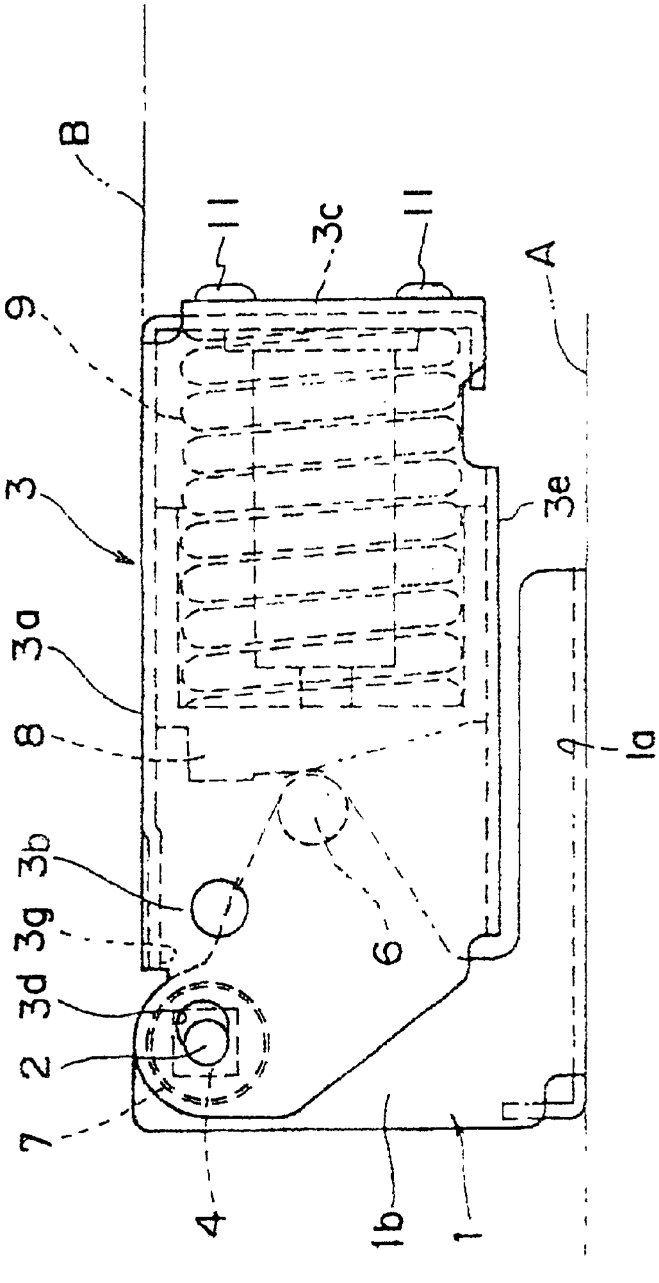
FIG. 1 is a side view of an original cover closer by this invention.
Figure 2:
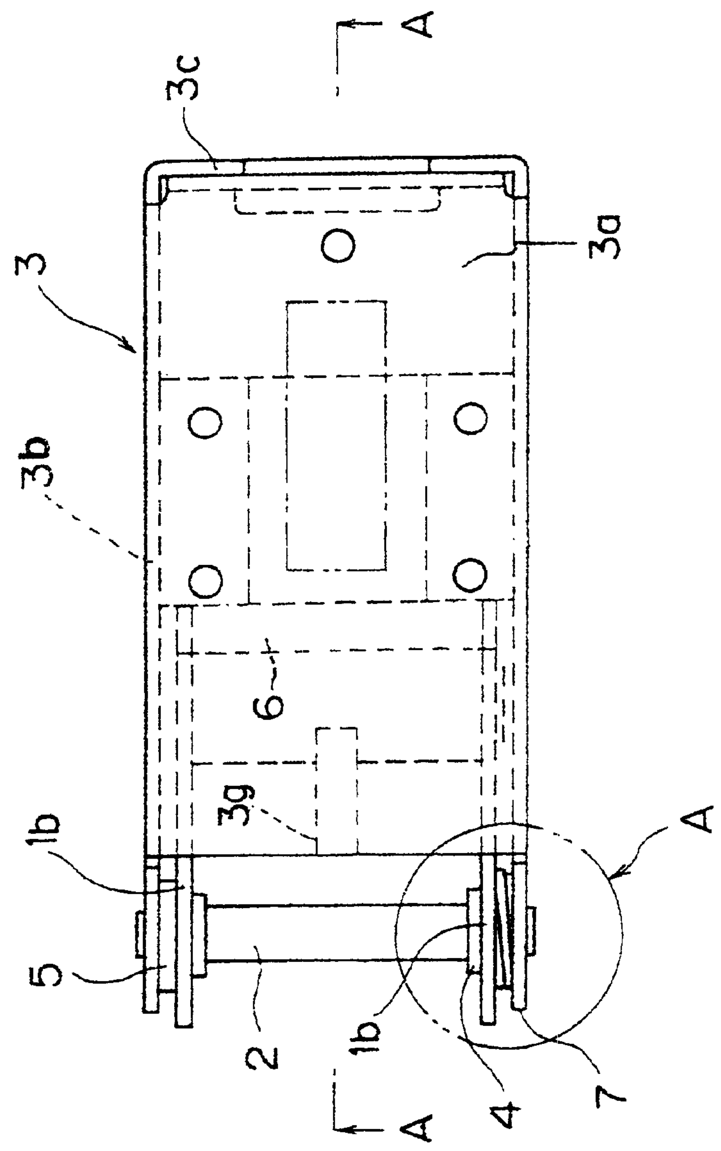
FIG. 2 is a plan view of the original cover closer shown in FIG. 1.
Figure 3:
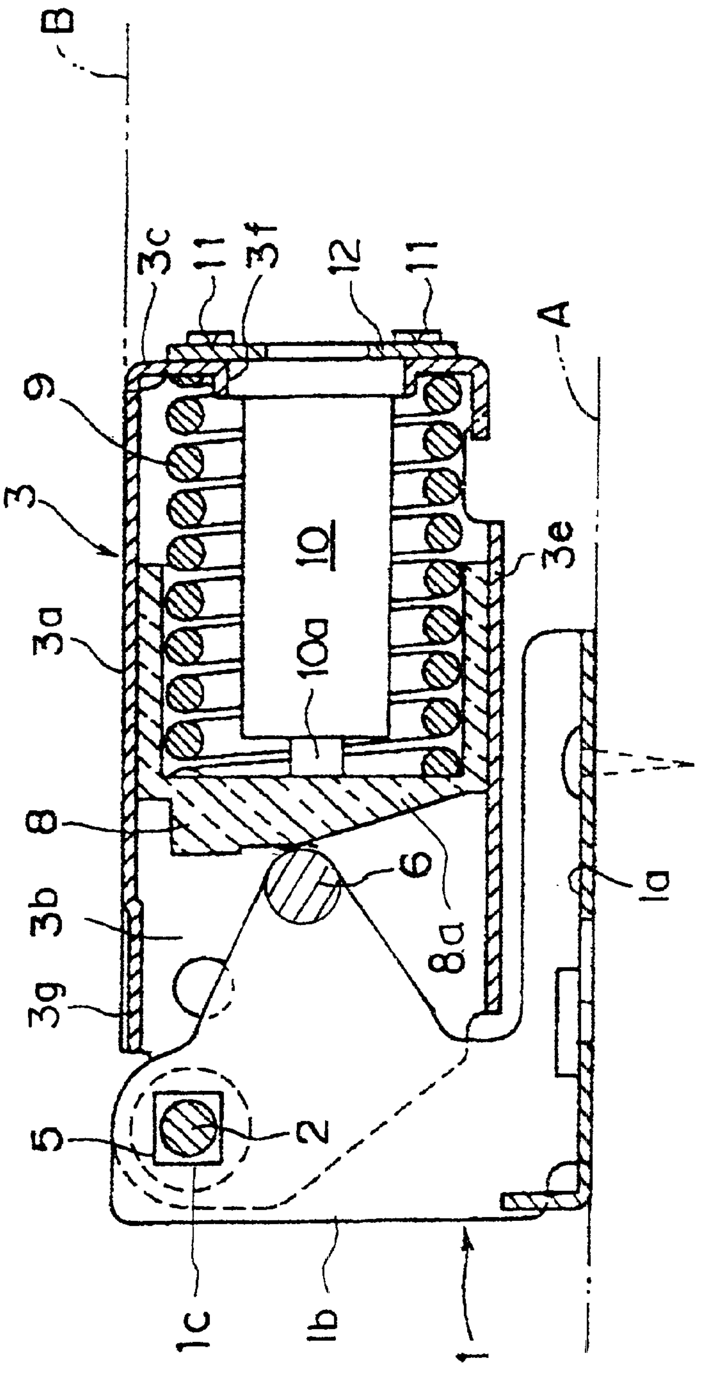
FIG. 3 is a sectional view along line A—A of FIG. 2.
Figure 4:
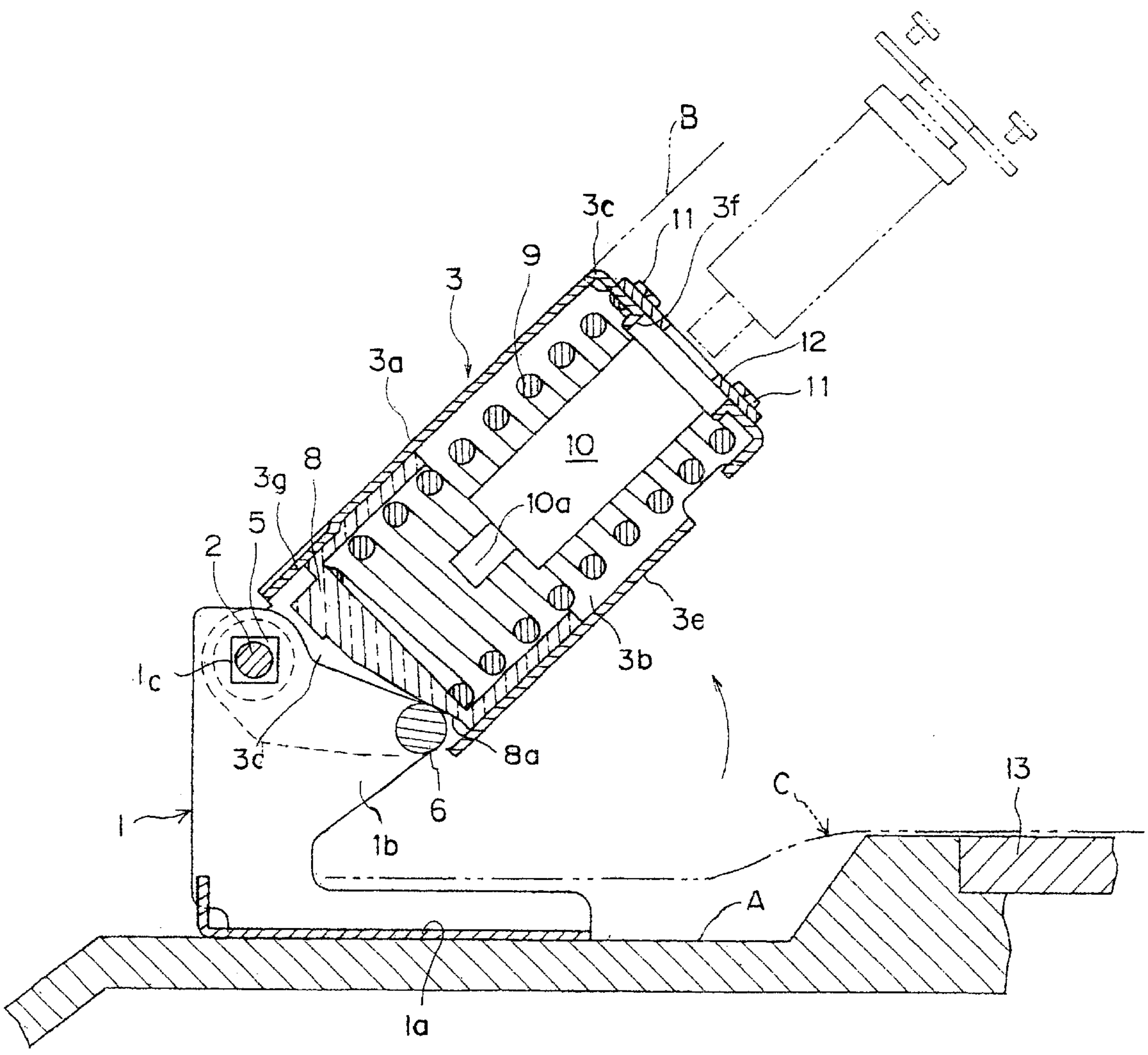
FIG. 4 is a sectional side view showing the condition where the original cover has been opened from the condition shown in FIG. 3.
Figure 5:
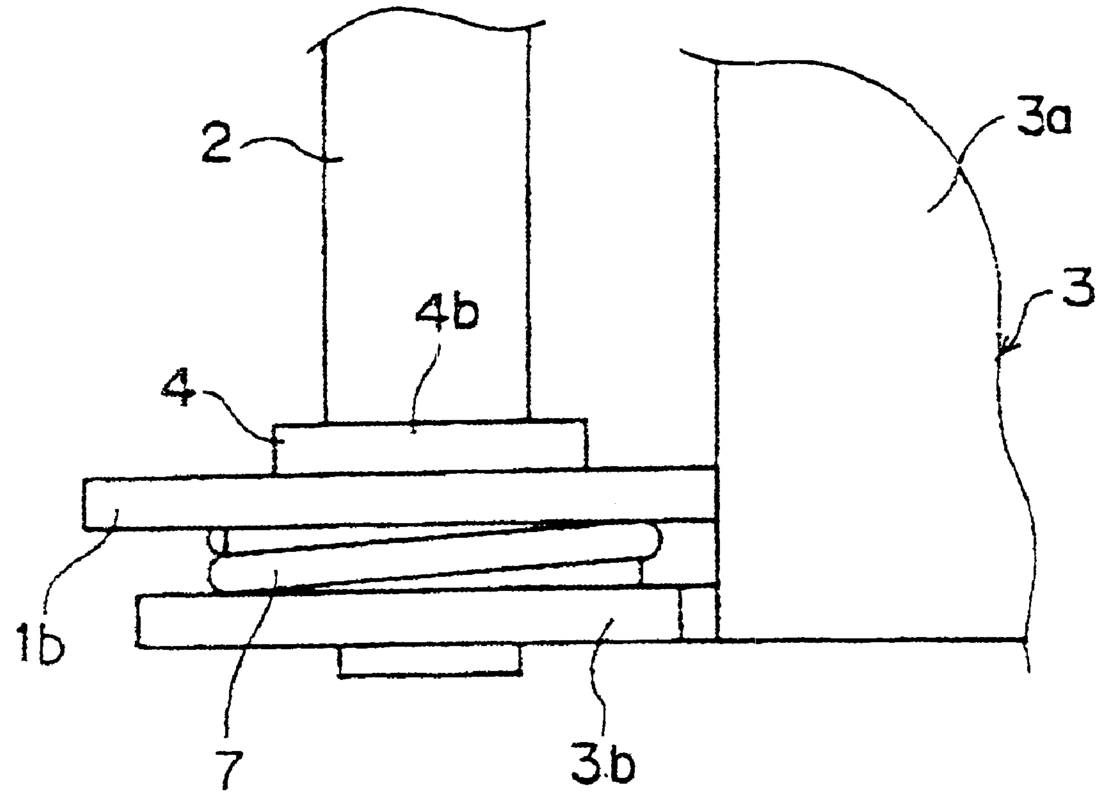
FIG. 5 is an enlarged plan view of the portion indicated as A in FIG. 2.
Figure 6:
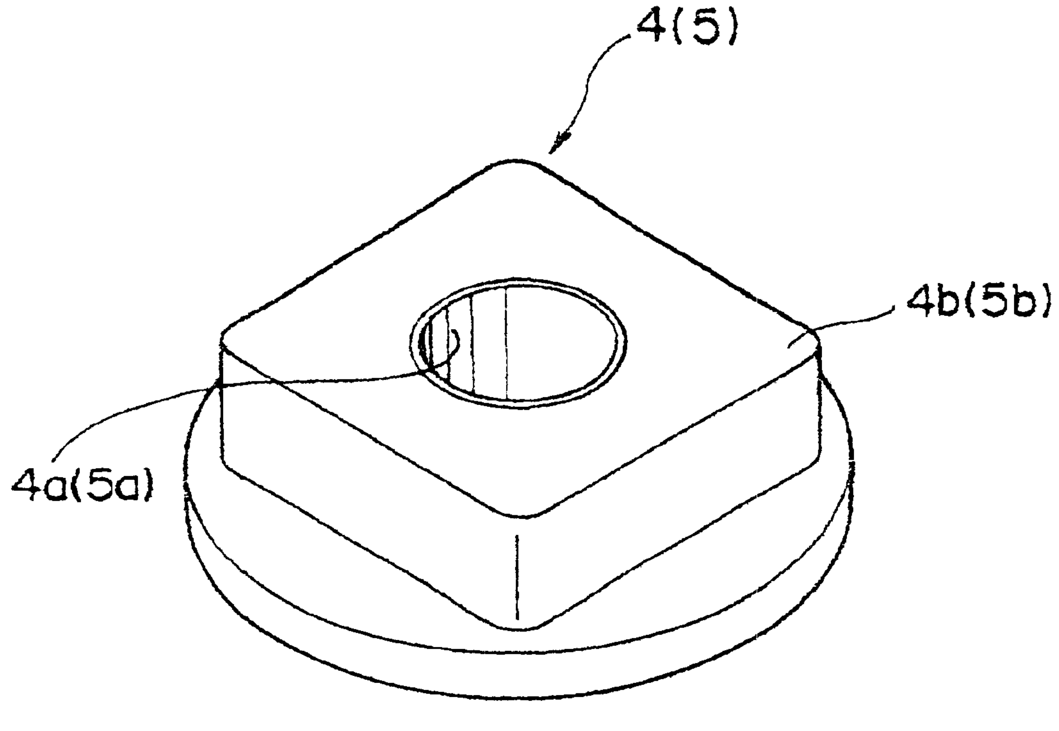
FIG. 6 is a perspective view of a bearing.

The drawings show an embodiment of this invention. 1 is a mounting member, which is made of a metal plate with a conductive property, has a mounting base 1*a* and side plates 1*b*, which are raised from both sides of mounting base 1*a,* and is mounted to the main device unit A of a copier or printer, indicated by imaginary lines. 3 is a supporting member, which likewise is made of a metal plate with a conductive property, has a back plate 3*a* as well as side plates 3*b* and top plate 3*c*, which are bent from back plate 3*a,* and with which one end of each of the side plates 3*b* is axially supported via hinge pin 2 to the corresponding side plate 1*b* of mounting member 1 in a manner enabling rotation. The rear part of an original cover B, which is also indicated by imaginary lines, is mounted to the back plate 3*a* of supporting member 3. Guitar-shaped pivotally supporting holes 3*d* (of which only one is shown in FIG. 1) are provided at the portions at which the respective side plates 3*b* of supporting member 3 are axially supported by hinge pin 2 to enable detachment of supporting member 3 from hinge pin 2. Bearing members 4 and 5, which are made for example of POM or other synthetic, non-conductive resin materials, are mounted, in a manner by which the bearing members 4 and 5 themselves are made unrotatable, to portions at which hinge pin 2 is supported between the side plates 1*b* of mounting member 1, and hinge pin 2 is inserted and supported in bearing holes 4*a* and 5*a* of these bearing members 4 and 5. Bearing members 4 and 5 respectively have mounting parts 4*b* and 5*b* of substantially rectangular cross-sectional shape and are inserted and fixed in rectangular mounting holes 1*c* (of which only one is shown in FIGS. 3 and 4) provided in both side plates 1*b* of mounting plate 1. The shapes of bearing holes 4*a* and 5*a* and the shapes of mounting parts 4*b* and 5*b* of bearing members 4 and 5 are not restricted in particular and are not limited to those of the embodiment. That is, these may be of various shapes, such as triangular, pentagonal, D-shaped, oval, etc. Also, the material of the bearing members is not restricted to POM, and ceramic materials or other non-conductive materials or conductive metal materials, etc. may be used as is suitable or necessary. At the part at which one of the side plates 1*b* of mounting member 1 and the correspondingly opposing side plate 3*b* of supporting member 3 are mutually connected by hinge pin 2, a coil-spring-like conductive member 7 is wound around hinge pin 2 so as to contact the side plate 1*b* and side plate 3*b* and thereby maintain electrical conductance across mounting member 1 and supporting member 3.

Furthermore, a pressure bearing pin 6 is axially fixed in a non-rotatable manner to positions of both side plates 1*b* of mounting member 1 that differ from the positions at which hinge pin 2 is mounted (the forward position in the present case).

Besides the abovementioned back plate 3*a,* side plates 3*b*, and top plate 3*c,* supporting member 3 has holding parts 3*e* (of which only one is shown), and a cam slider 8 is slidably fitted in the interior of supporting member 3 while being held by the holding parts 3*e,* and the cam part 8*a* of cam slider 8, which is inclined in one direction, is contacted against pressure bearing pin 6.

A coil spring 9 is resiliently disposed between cam slider 8 and the top plate 3*c* of supporting member 3. This coil spring 9 pushes cam slider 8 towards the pressure bearing pin 6 side and urges supporting member 3 via cam slider 8 in the opening direction of original cover B or in the closing direction of original cover B from a prescribed closing angle onwards.

An insertion hole 3*f* is provided in top plate 3*c,* a damper means 10, which for example is of a known piston arrangement that makes use of a viscous fluid, is inserted, with the piston boss 10*a* side first, into the interior of coil spring 9 from this insertion hole 3*f,* and damper means 10 is made detachable by detachably mounting the mounting plate 12 thereof to top plate 3*c* by means of machine screws 11.

A brake means 3*g,* comprised of a protruding strip of flat, band-like form, is provided at the portion at which slider 8, which slides inside supporting member 3, comes in contact from a prescribed angle onwards in the process of the opening operation of original cover B. The location at which this brake means 3g is disposed is not restricted in particular and brake means 3g may also be omitted as necessary.

In the condition where the original cover is closed as shown in FIGS. 1 and 3, since the line of action of coil spring 9 coincides with the axial center of pressure bearing pin 6, supporting member 3, in the closed condition, is not urged to rotate in either the direction of opening or the direction of closing, the original cover B is maintained in the stable closed condition. At this time, the piston boss 10a of damper means 10 is put in contact with the inner bottom part of cam slider 8. Here, the line of action of coil spring 9 may be shifted to the lower part of pressure bearing pin 6 or the shape of cam part 8a, provided at one end of cam slider 8, may be changed to urge the original cover B in the opening direction when it is closed.

When original cover B is opened from the condition shown in FIGS. 1 and 3, the position of contact of cam part 8a of cam slider 8 with pressure bearing pin 6 moves from the high side to the low side of the cam part 8a and original cover B is opened by the resilient force of coil spring 9 with the inherent weight of original cover B being canceled and reduced. When the hand is released from the opened original cover B, the position of contact of pressure bearing pin 6 encounters the movement resistance of cam part 8a of cam slider 8, which is urged to slide in one direction by coil spring 9, towards the high side, and the rotational moment, which original cover B generates about hinge pin 2 via supporting member 3, is thereby balanced with the rotational torque generated by the resilient force of coil spring 9 and the cam slider 8 in contact with pressure bearing pin 6. With the present embodiment, original cover B is stopped and held with stability at an opening angle of original cover B of 30β or more.

At this time, the tip of piston boss 10a of damper means 10 is separated from the inner top part of cam slider 8.

In accompaniment with the opening operation of original cover B, brake means 3g presses against cam slider 8 to act as a brake and thereby prevent original cover B from opening suddenly and functions to increase the allowable stable retention range of original cover B. Though impetus due to inertia is applied during the process of closing original cover the tip of piston boss 10a of damper means 10 begins to contact the inner bottom part of cam slider 8 in the vicinity of a prescribed closing angle (approximately 20β in the present embodiment) and as the damper begins to act, the rotation of supporting member 3 is controlled so as to prevent original cover B from becoming closed suddenly.

This invention can be applied not only to the original cover closer illustrated in the drawings but may also be applied as it is for example to a type of opening/closing device in which the lifting member of original cover B is axially attached to the free end side of the supporting member. In this case, one end part of coil spring 9 is not put in contact against the top plate 3c of supporting member 3 but is put in contact against the side beyond the fulcrum of the lifting member and presses the lifting member in the direction that overlaps it with the back plate of the supporting member. It is in this sense that the claims of this invention refer to the free end side of the supporting member.

With the above-described embodiment, grease may be applied to the cam part 8a of cam slider 8, and though this grease becomes attached to the surface of pressure bearing pin 6, since pressure bearing pin 6 is hardly exposed in the direction of contact glass 13 when original cover B is opened as shown in FIG. 4, the end parts of original C placed for copying or printing on contact glass 13 will not come in contact with pressure bearing pin 6, to which grease has become attached and become soiled by grease due to the pressure bearing pin 6.

Figure 7:
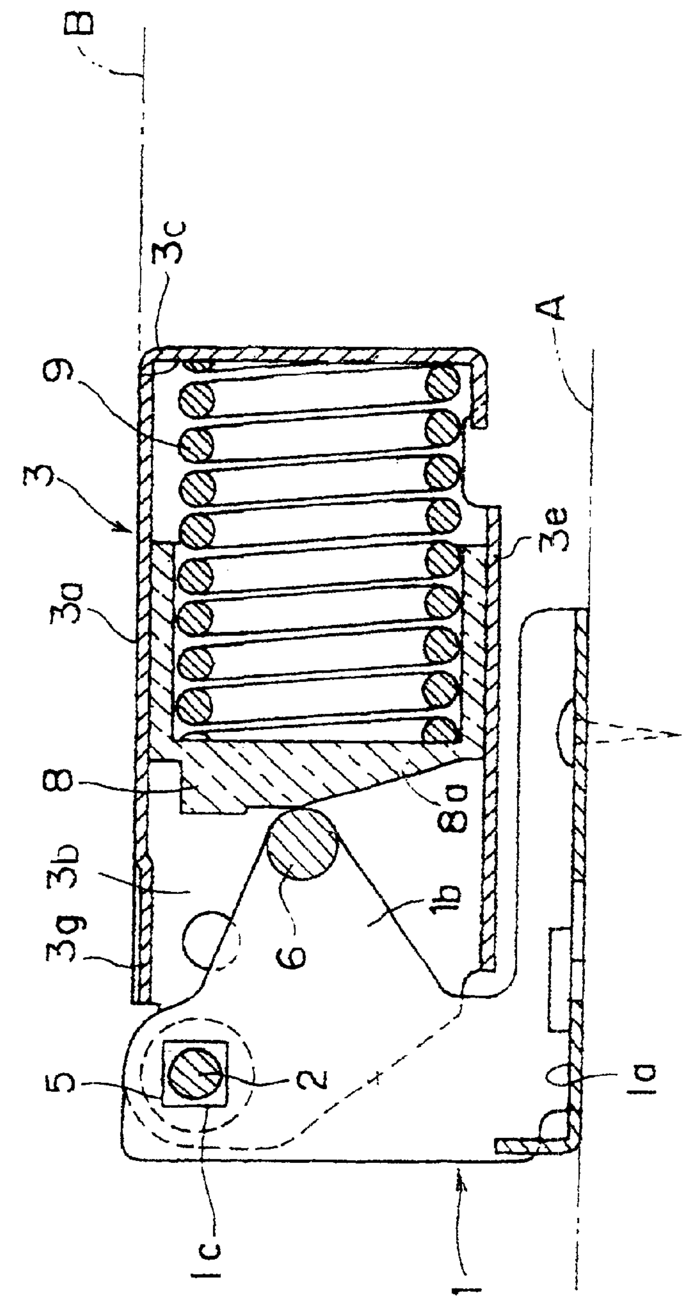
FIG. 7 is a sectional side view of another embodiment of an original cover closer by this invention.

FIG. 7 shows another embodiment of this invention, and as can be seen from the drawing, this embodiment has the damper between cam slider 8 and the free end side of supporting member 3 omitted in comparison to the embodiment illustrated in FIGS. 1 through 6. The present invention can also be applied to an original cover closer of such an arrangement.

Figure 8:
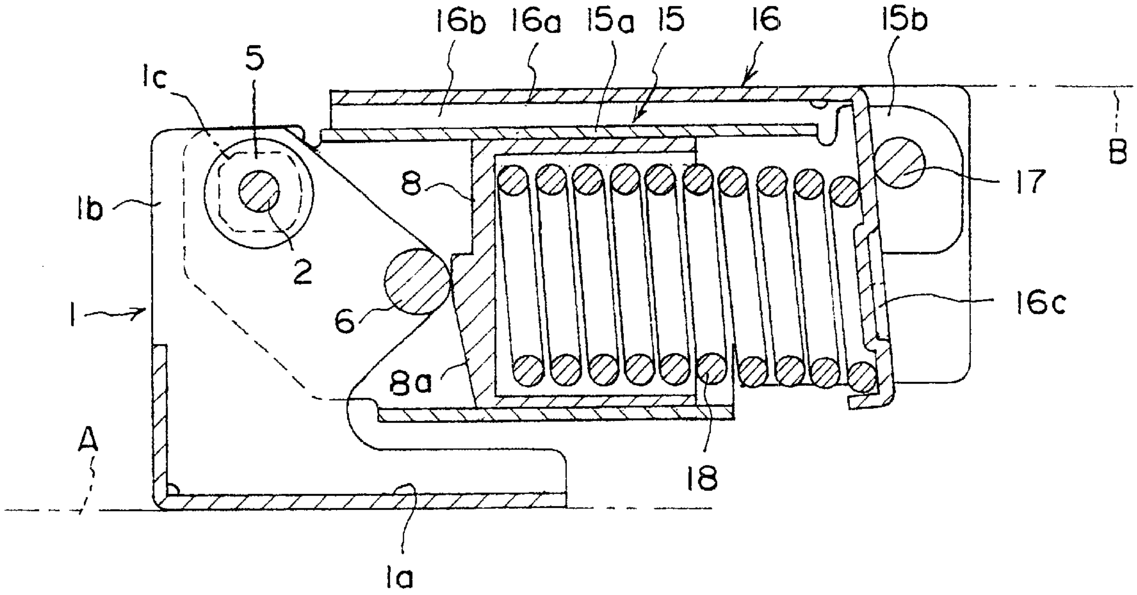
FIG. 8 is a sectional side view of yet another embodiment of an original cover closer by this invention.
Figure 9:
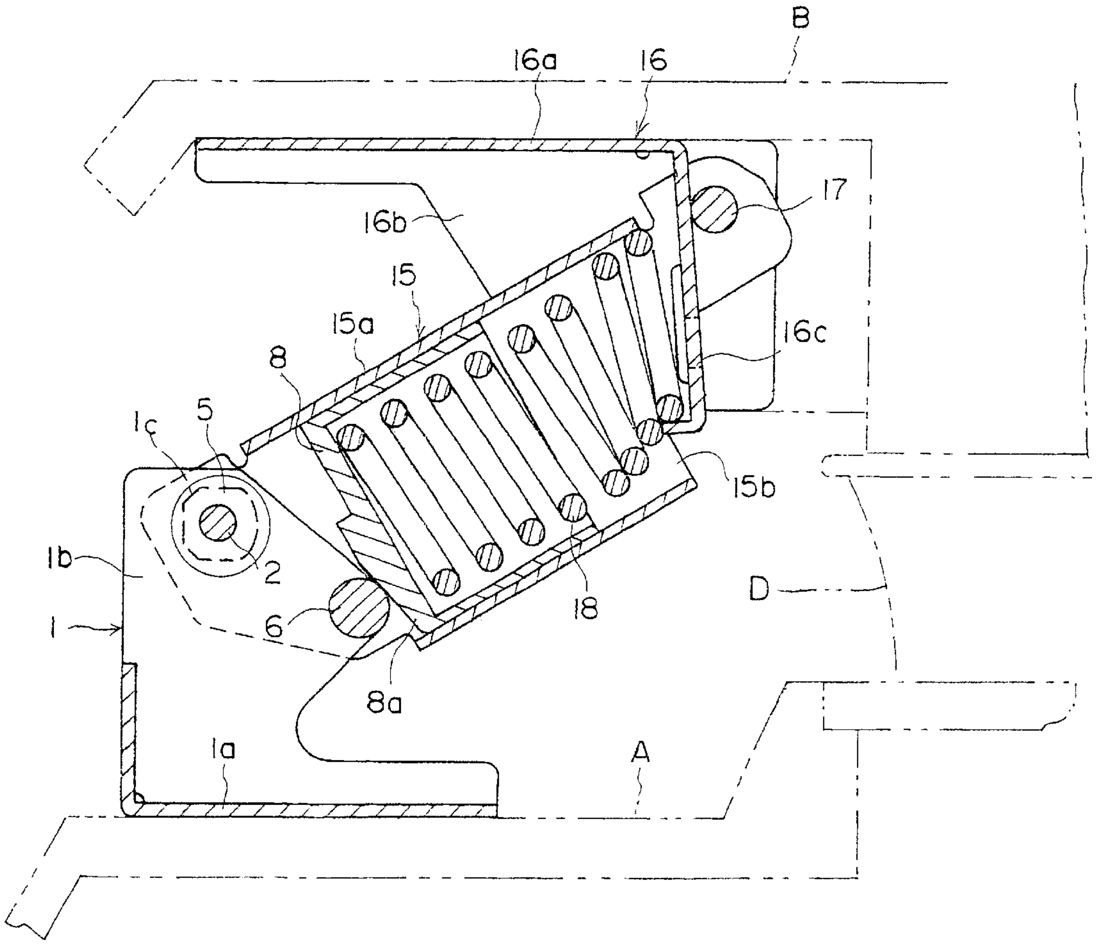
FIG. 9 is a sectional side view, which shows an example of use of the original cover closer shown in FIG. 8.

FIGS. 8 and 9 show yet another embodiment of this invention, and with this embodiment, a lifting member 16, having side plates 16b and top plate 16c, which are bent from a back plate 16a, is axially supported via connecting pin 17 at the respective free end sides of the side plates 15b (of which only one is shown), which are bent from the respective sides of back plate 15a of supporting member 15, in a manner whereby the respective side plate 16b can be rotated in the direction opposite the direction of rotation of supporting member 15. Top plate 16c of lifting member 16 is bent at a complementary angle with respect to back plate 16a and has engaging parts (not shown), which are protruded from the respective end parts thereof, engaged in engaging holes (not shown) provided in the respective side plates 16b, and by the contacting of the end part of coil spring 18 against this inclined top plate 16c, coil spring 18 is priorly bent in the direction of rotation of lifting member 16.

With such an embodiment, an arrangement can be provided that has a reduced number of parts in the original cover closer with a lifting function and is low in manufacturing cost. An advantage is also provided in that the operation of lifting member 16 can be performed smoothly in the operation of lifting the original cover B as shown in FIG. 9.

This invention also provides an original cover closer of the following arrangement.

Figure 10:
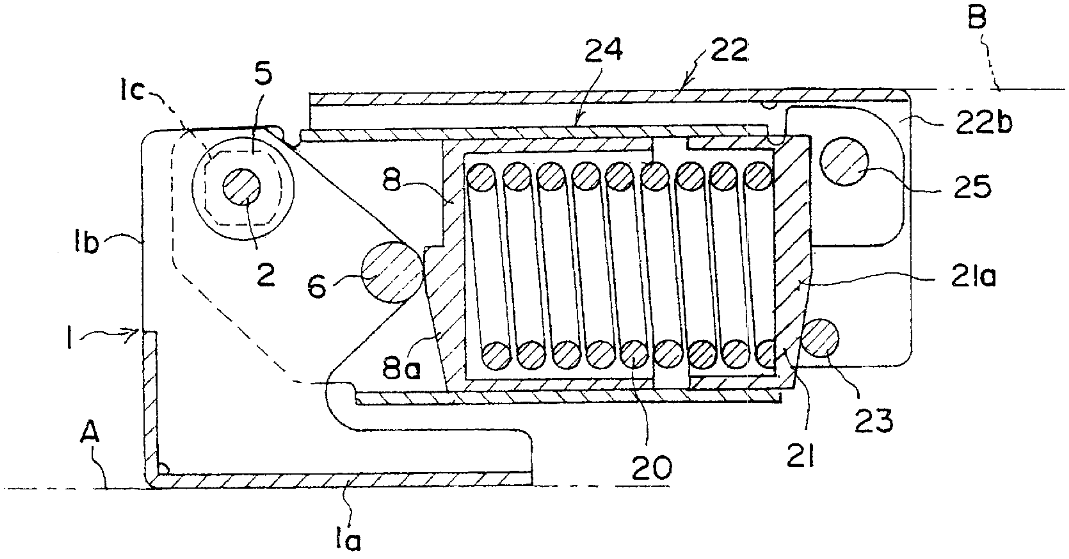
FIG. 10 is a sectional side view of yet another embodiment of an original cover closer by this invention.
Figure 11:
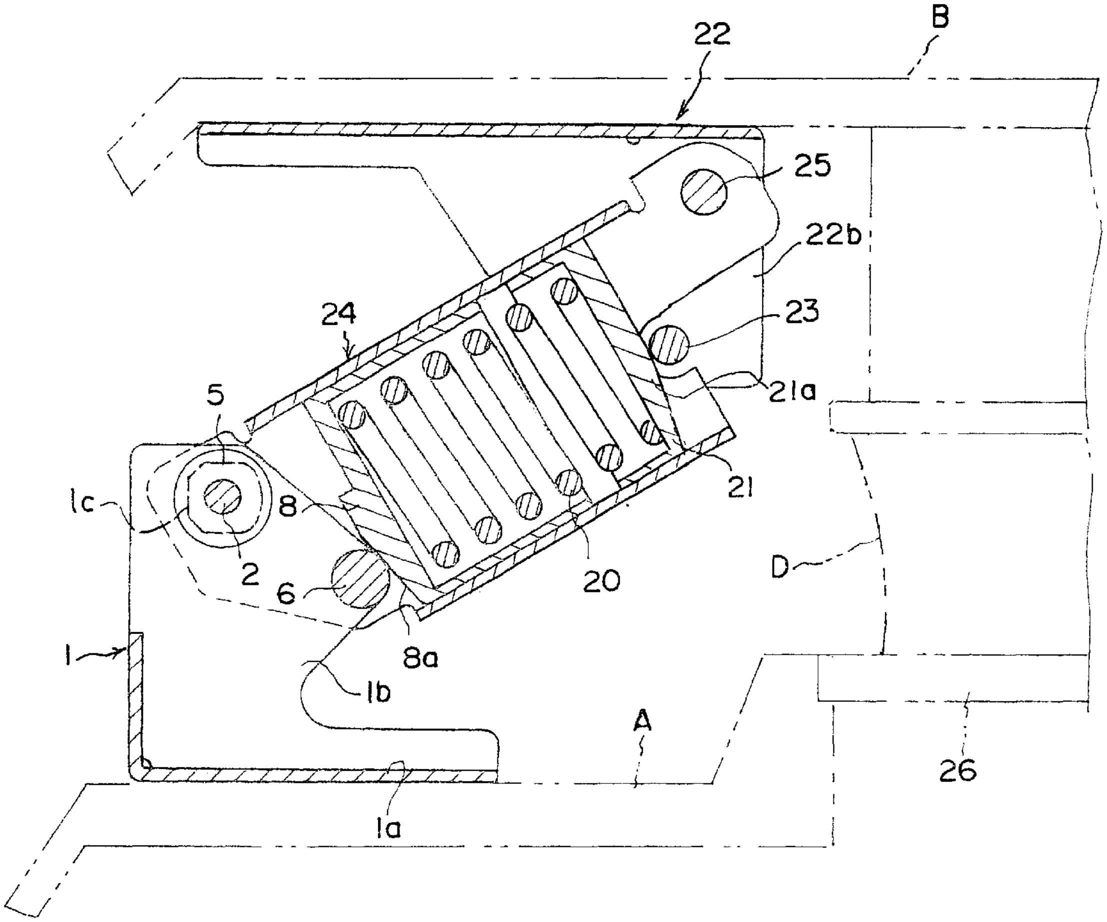
FIG. 11 is a sectional side view, which shows an example of use of the original cover closer shown in FIG. 10.

FIGS. 10 and 11 show yet another embodiment of this invention, and with this embodiment, a spring bearing cam member 21 is slidably fitted to one end part of a coil spring 20, and the cam face 21a of this spring bearing cam member 21 is made to contact an actuating member 23, which is axially mounted to both side plates 22b (of which only one is shown) that extend beyond the fulcrum of lifting member 22.

Coil spring 20 thus urges supporting member 24 in the direction of opening the original cover B while pressing lifting member 22 in the direction that overlaps it with supporting member 24 via actuating member 23, which is in contact with the cam face 21a of spring bearing cam member 21, and in the case where lifting member 22 is to be rotated in reverse to accommodate a thick original D, actuating member 23 swings about connecting pin 25 as the fulcrum and presses spring bearing cam member 21 against the resilient force of coil spring 20 to allow reverse rotation of original cover B and enable covering of the upper surface of thick original D by original cover B from above contact glass 26. Then when thick original D is removed or original cover B is pushed in the opening direction, lifting member 22 returns to the original position at which it overlaps with supporting member 24.

This invention can thus be applied to an original cover closer of the above arrangement.

In addition, though in the embodiments described above, the cam slider and the spring bearing cam member were both arranged to be held in a slidable manner by a holding plates bent from the respective side plates of the supporting member, this holding may also be accomplished by uneven fitting between the respective side plates. Also, the cam slider and the spring bearing cam member may be arranged from oleo-resin to eliminate the lubrication oil to be applied to the cam face.

Figure 12:
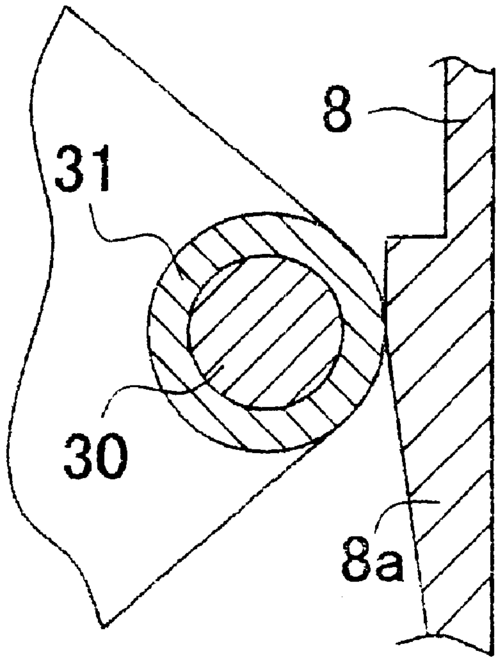
FIG. 12 is an enlarged sectional view of another embodiment of the pressure bearing pin.

Furthermore, a cylindrical member 31 may be fitted to the outer circumference of pressure bearing pin 30 as shown in FIG. 12 and this cylindrical member 31 may be arranged to be rotatable.

What is claimed is:

1. An original cover closer, comprised of a mounting member, which has a mounting base and side plates, which are raised from both sides of the mounting base, and has said mounting base mounted to the main device unit side, a supporting member, which supports an original cover, has a back plate as well as side plates and a top plate, which are bent from the back plate, and has one end of each of the side plates being rotatably mounted via a hinge pin to the corresponding side plate of said mounting member, a cam slider, which is fitted inside the supporting member in a manner enabling sliding towards the side of said mounting member, a pressure bearing pin, which is axially mounted between the respective side plates of said mounting member and is made to contact a cam part provided at the end of the cam slider, and a coil spring, which is resiliently installed between said cam slider and the free end side of said supporting member.

2. An original cover closer, comprised of a mounting member, which has a mounting base and side plates, which are raised from both sides of the mounting base, and has said mounting base mounted to the main device unit side, a supporting member, which supports an original cover, has a back plate as well as side plates and a top plate, which are bent from the back plate, and has one end of each of the side plates being rotatably mounted via a hinge pin to the corresponding side plate of said mounting member, a cam slider, which is fitted inside the supporting member in a manner enabling sliding towards the side of said mounting member, a pressure bearing pin, which is axially mounted between the respective side plates of said mounting member and is made to contact a cam part provided at the end of the cam slider, a coil spring, which is resiliently installed between said cam slider and the free end side of said supporting member, and a damper means, which is inserted inside said coil spring and exhibits a damper action by the contacting of the tip of a piston boss with said cam slider from the point at which said supporting member is set at a prescribed angle of rotation in the process of closing said original cover.

3. An original cover closer, comprised of a mounting member, which has at least a mounting base and side plates, which are raised from both sides of the mounting base, and has said mounting base mounted to the main device unit side, a supporting member, which has at least a back plate and side plates, which are bent from the back plate, and has both side plates being rotatably connected via a hinge pin to both side plates of said mounting member, a lifting member, which has a back plate, to which an original cover is mounted, has side plates and a top plate, which are bent from the back plate, and is axially attached via a connecting pin to the respective free end sides of both side plates of said supporting member in a manner whereby both side plates of the lifting member can rotate in a direction that differs from the direction of rotation of the supporting member, a pressure bearing pin, which is axially mounted at a position, between the respective side plates of said mounting member, that differs from the mounting position of the hinge pin, a cam slider, which is fitted inside the supporting member in a manner enabling sliding and with which the cam part thereof contacts the pressure bearing pin, and a coil spring, which is resiliently installed between said cam slider and said lifting member and is thereby made to urge said supporting member at least in the direction of opening of the original cover while rotatingly urging said lifting member in the direction that overlaps it with the supporting member.

4. An original cover closer, comprised of a mounting member, which has at least a mounting base and side plates, which are raised from both sides of the mounting base, and has said mounting base mounted to the main device unit side, a supporting member, which has at least a back plate and side plates, which are bent from the back plate, and has both side plates being rotatably mounted via a hinge pin to both side plates of said mounting member, a lifting member, which has a back plate, to which an original cover is mounted, has side plates and a top plate, which are bent from the back plate, and is axially attached via a connecting pin to the respective free end sides of both side plates of said supporting member in a manner whereby both side plates of the lifting member can rotate in a direction that differs from the direction of rotation of the supporting member, an actuating member, which is mounted between the side plates of the lifting member at positions that are located at the side at which the lifting member is axially mounted to said supporting member and swing about said connecting pin as the fulcrum during the rotation of said lifting member, a pressure bearing pin, which is axially mounted at a position, between the respective side plates of said mounting member, that differs from the mounting position of the hinge pin, a cam slider, which is fitted inside the supporting member in a manner enabling sliding with the cam part thereof being made to contact the pressure bearing pin, a spring bearing cam member, which is slidably fitted at the free end side of the interior of said supporting member while being made to contact said actuating member, and a coil spring, which is resiliently installed between said cam slider and said lifting member and is thereby made to urge said supporting member at least in the direction of opening of the original cover while rotatingly urging said lifting member in the direction that overlaps it with the supporting member.

5. An original cover closer as set forth in claim 1, wherein pivotally supporting holes at the supporting member side to which said hinge pin is connected have guitar-like shapes and enable said supporting member to be detached from said hinge pin.

6. An original cover closer as set forth in claim 1, wherein a conductive material with elasticity is wound around said hinge pin between said mounting member and said supporting member to achieve mutual electrical conduction between said members.

7. An original cover closer as set forth in claim 1, wherein a brake means, which prevents the sudden springing up of said original cover, is disposed between said supporting member and the cam slider that is slidably fitted inside said supporting member.

8. An original cover closer as set forth in claim 1, wherein said pressure bearing pin has a cylindrical member fitted in a rotatable manner to its outer periphery.

* * * * *